Oct. 28, 1952  J. L. WESTHAVER  2,615,347
MOTOR DRIVE FOR CAMERAS
Filed Jan. 20, 1950
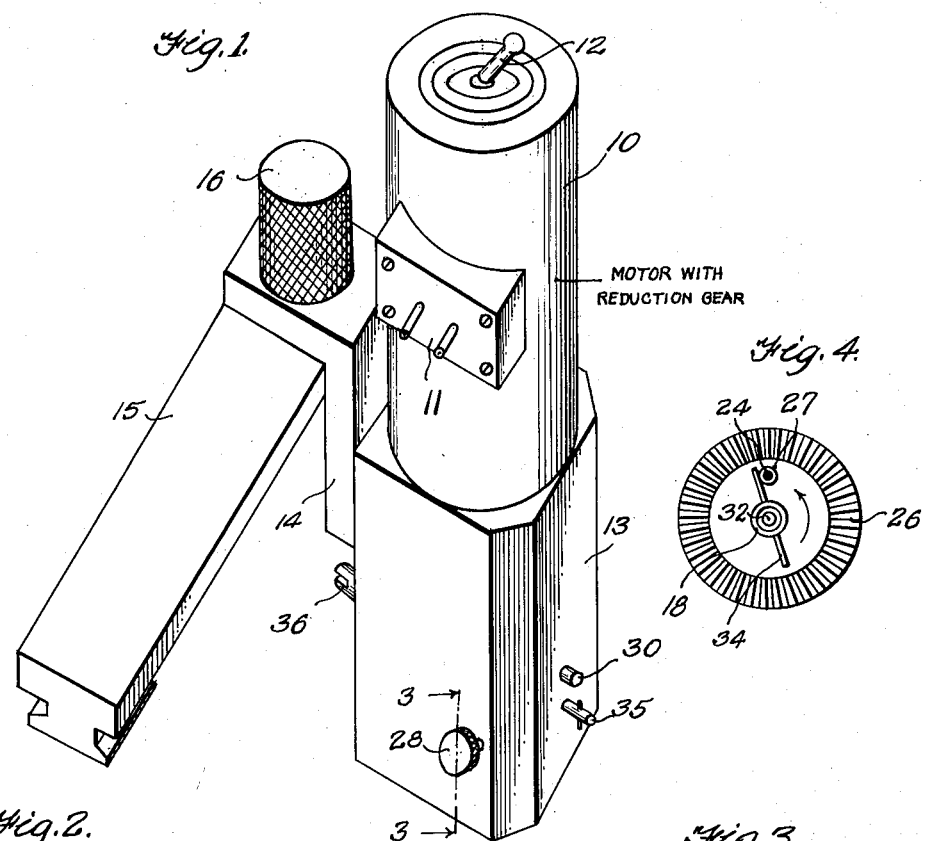
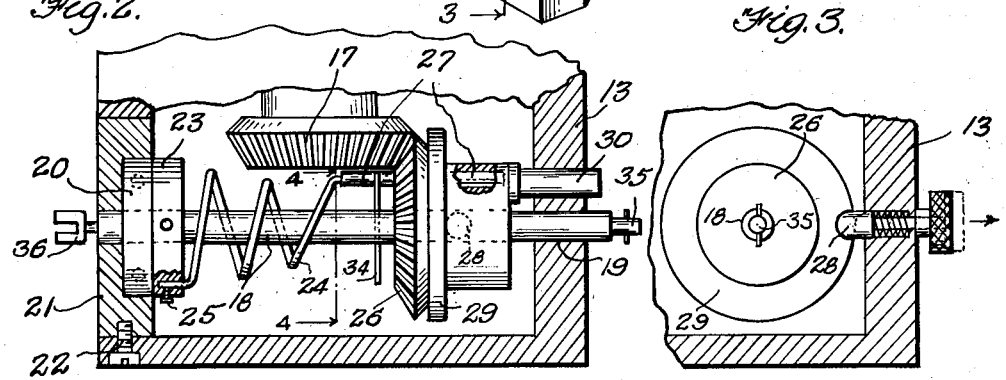
INVENTOR
JOHN L. WESTHAVER
BY
HIS ATTORNEY Patented Oct. 28, 1952

2,615,347

UNITED STATES PATENT OFFICE 2,615,347

MOTOR DRIVE FOR CAMERAS

John L. Westhaver, San Diego, Calif.

Application January 20, 1950, Serial No. 139,677

5 Claims. (Cl. 74—411)

1

This invention relates to a motor drive for cameras, and the like, and has for one of its objects the production of a simple and efficient means for absorbing shock for a quick starting camera operating motor.

A further object of this invention is the production of a simple and efficient means for automatically releasing the driven gear from the driving gear of a motor when a manually controlled retaining means is released.

Another object of the present invention is the production of a self-adjusting and adapting drive shaft to facilitate the fitting of the drive mechanism to various types of cameras.

Other objects and advantages of the present invention will be apparent throughout the following specification and claims.

In the drawing:

Figure 1 is a perspective view of the camera motor drive means;

Figure 2 is a fragmentary vertical sectional view of the lower portion of the clutch and drive mechanism, certain parts being shown in elevation;

Figure 3 is an enlarged fragmentary vertical sectional view taken on line 3—3 of Figure 1;

Figure 4 is a vertical sectional view taken on line 4—4 of Figure 2;

Figure 5 is a longitudinal sectional view of the camera drive shaft, a portion thereof being shown in elevation.

By referring to the drawing in detail it will be seen that 10 designates the motor casing which is provided with a suitable electrical connection 11, and a control switch 12. The motor casing carries a conventional electric motor and reduction gear and is supported upon a gear housing 13. The gear housing 13 is attached to a hanger motor bracket 14, which in turn is secured to the attaching slide for the motor bracket 15 by a motor holder screw 16.

A driving gear 17 is driven by the motor within the casing 10 and is mounted within the housing 13, as shown in Figure 2. A horizontal drive shaft 18 is journalled at one end in the housing 13, as at 19, and is journalled at its opposite end in the ball-bearing journal ring 20 which is carried by the end bearing plug 21 of the housing 13. The bearing plug 21 is anchored in position by means of the anchoring screw 22. A collar 23 is fixed to the shaft 19 and one end of the spiral expansion tension spring 24 is anchored to the collar 23, as at 25.

A sliding driven gear 26 in the nature of a clutch gear is slidable longitudinally of the drive

2 shaft 18, and is movable toward and away from the drive gear 17. The gears 17 and 26 are beveled gears, as shown in Figure 2. The driven gear 26 is provided with a protruding drive rod 27 which extends longitudinally and parallel to the drive shaft 18. As stated above one end of the tapering spiral expansion spring 24 is anchored to the collar 23, which collar 23 is fixed to the drive shaft 18. The opposite end of the spring 24 is anchored within the outer extremity of the drive rod 27 and this spring 24 is adapted to automatically force the driven gear 26 out of meshing engagement with the drive gear 17, when the lock pin 28 is released therefrom. The driven gear 26 carries a steel annular collar 29 against the side face of which the spring pressed lock pin 28 is adapted to abut to hold the driven gear 26 in mesh with the drive gear 17. The inner end of the lock pin 28 when retracted in the direction of the arrow shown in Figure 3 will ride upon the periphery of the collar 29 as the shock-absorbing spring 24 expands to shift the gear 26 out of mesh with the gear 17. When it is desired to drive the shaft 18, the plunger 30, which is slidably mounted through the housing 13 and which frictionally abuts the rear of the gear 26, is moved inwardly. This plunger 30 is not connected to the gear 26 and is freely slidable through the housing 13.

The drive shaft 18 is provided with a longitudinally extending hollow portion or socket 31. A loosely connected longitudinally extending drive rod 32 is fitted in the socket 31 and is loosely connected at its inner end 33 within the socket 31 by means of the transversely extending actuating pin 34. The pin 34 extends through the shaft 18 and projects beyond the opposite sides thereof for a sufficient distance to abut the abutment rod 27 of the gear 26, as the gear 26 is rotated by the drive gear 17, to impart rotary movement to the drive shaft 18. The shaft 18 is provided with a terminal 35 for engagement with an operating hand crank for optional manual operation of the shaft 18. A fork-shaped terminal 36 is formed upon the outer end of the drive rod 32 engaging the camera drive.

It should be noted that the expansion spring 24 constitutes an initial spring drive for the drive shaft 18 and serves to exert a slight pressure against the driven gear 26, so as to cause this gear 26 to slide out of engagement with the drive gear 17, when the spring pressed lock pin 28 is pulled away from engagement with the rear face of the collar 29. The spring 24 acts as a shock absorber for the quick-starting motor, which actuates the drive gear 17, so as to allow the camera to start without a shock to the driving mechanism thereof. The spring 24 should be just stiff enough to cause the camera to start with about one-half turn of the shaft 18. At the end of the half turn, the drive pin 34 abuts the abutment rod 27 to provide a solid drive between the driven gear 26, the drive shaft 18, and the actuating mechanism for the camera to which the shaft 18 is attached. The loosely connected drive rod 32, because of its connection with the drive shaft 18, in the manner shown and described, will provide a maximum movement in fitting the motor to the driving mechanism of the camera, thereby avoiding the necessity of exact or minute alignment of the shaft 18 with the camera driving mechanism. The spring pressed lock pin 28 is retracted to the position shown in dotted lines in Figure 3, the expansion spring 24 will slide the driven gear 26 out of meshing engagement with the drive gear 17. At this time the inner end of the lock pin 28 will ride upon the periphery of the collar 29. The gear 26 may be pushed into engagement with the gear 17 by means of the plunger 30 when it is desired to render the shaft 18 active.

It should be understood that certain detail changes in the mechanical construction and arrangement of parts may be employed without departing from the spirit of the invention so long as such changes fall within the scope of the appended claims.

Having described the invention, what is claimed as new is:

1. A drive means for cameras comprising a drive gear, a camera drive shaft, a driven gear longitudinally movable upon said camera drive shaft into and out of engagement with said drive gear, a yieldable means connecting said driven gear to said drive shaft and constituting an initial shock absorber upon the initial starting of the rotation of said shaft, a slidable plunger engaging said driven gear to move said driven gear into meshing engagement with said drive gear, said yieldable means being expansible and adapted to shift said driven gear to an inoperative position, and a releasable lock for holding said driven gear in an operative position for contact with said drive gear against the expansible action of said yieldable means.

2. A driving mechanism of the class described comprising a drive gear, a drive shaft, a driven gear slidable upon said drive shaft into and out of meshing contact with said drive gear, an expansion coil spring loosely fitting around said shaft and anchored at one end to said shaft; an abutment member protruding from said driven shaft in substantial parallel relation to said shaft, the spring constituting a shock absorbing means between the shaft and driven gear at the time of the initial starting of the rotation of said shaft, a releasable locking means mounted in a position to engage said driven gear and to hold the driving gear, said spring being adapted to automatically move said driven gear to an inoperative position out of meshing engagement with said drive gear when said locking means is released, and means for moving said driven gear into engagement with said drive gear.

3. A driving mechanism of the class described comprising a drive gear, a drive shaft, a driven gear slidable upon said drive shaft into and out of meshing contact with said drive gear, an expansion coil spring loosely fitting around said shaft and anchored at one end to said shaft, an abutment member protruding from said driven shaft in substantial parallel relation to said shaft, the spring constituting a shock absorbing means between the shaft and driven gear at the time of the initial starting of the rotation of said shaft, a releasable locking means mounted in a position to engage said driven gear and to hold the driving gear, said spring being adapted to automatically move said driven gear to an inoperative position out of meshing engagement with said drive gear when said locking means is released, means for moving said driven gear into engagement with said drive gear, and a transverse pin carried by said shaft and adapted to engage said abutment member in delayed timed relation with the starting of the drive gear for positively driving said driven gear.

4. A driving mechanism of the class described comprising a drive gear, a drive shaft, a driven gear slidable upon said drive shaft into and out of meshing contact with said drive gear, an expansion coil spring loosely fitting around said shaft and anchored at one end to said shaft, an abutment member protruding from said driven shaft in substantial parallel relation to said shaft, the spring constituting a shock absorbing means between the shaft and driven gear at the time of the initial starting of the rotation of said shaft, a releasable spring pressed lock pin mounted in a position to engage said driven gear and to hold the driving gear, said spring being adapted to automatically move said driven gear to an inoperative position out of meshing engagement with said drive gear when said locking means is released, means for moving said driven gear into engagement with said drive gear, and a transverse pin carried by said shaft and adapted to engage said abutment member in delayed timed relation with the starting of the drive gear for positively driving said driven gear.

5. A driving mechanism comprising a drive gear, a drive shaft driven by said drive gear, said shaft having a hollow portion, a loosely fitting longitudinally extending drive rod pivoted in said hollow portion and having a protruding end, said shaft having a crank engaging end, the protruding end of the rod having a camera drive terminal, and the connection of the shaft and rod providing a maximum variance in fitting the shaft to the driving mechanism of a camera, for operating the driving mechanism of a camera.

JOHN L. WESTHAVER.

REFERENCES CITED

The following references are of record in the file of this patent:

UNITED STATES PATENTS

| Number | Name | Date |
|---|---|---|
| 1,076,632 | Gammeter | Oct. 21, 1913 |
| 1,162,034 | Catucci | Nov. 30, 1915 |
| 1,400,368 | Manchester | Dec. 13, 1921 |
| 1,582,664 | Bennington | Apr. 27, 1926 |
| 1,771,630 | Hoe | July 29, 1930 |
| 1,855,746 | La Bar | Apr. 26, 1932 |
| 2,184,420 | Fraser | Dec. 26, 1939 |
| 2,495,689 | Bracke et al. | Jan. 31, 1950 |
| 2,513,213 | Schick | June 27, 1950 |

FOREIGN PATENTS

| Number | Country | Date |
|---|---|---|
| 449,129 | Germany | Sept. 8, 1927 |
| 176,619 | Switzerland | Apr. 30, 1935 |